US006590301B2

(12) United States Patent
Kalb

(10) Patent No.: US 6,590,301 B2
(45) **Date of Patent: *Jul. 8, 2003**

(54) DEVICE FOR SECURING A MOTOR VEHICLE

(75) Inventor: Roland Kalb, Rossach (DE)

(73) Assignee: Brose Fahrzeugteile GmbH & Co. KG., Coburg, Coburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,476

(22) Filed: Jan. 28, 1998

(65) Prior Publication Data

US 2003/0080620 A1 May 1, 2003

(30) Foreign Application Priority Data

Jan. 30, 1997 (DE) .......................................... 197 05 058

(51) Int. Cl.[7] .................................................. B60R 27/00

(52) U.S. Cl. ..................... 307/10.2; 307/10.1; 340/426; 340/545; 180/287; 318/466

(58) Field of Search ................................ 180/289, 287, 180/271, 281, 279; 340/426, 430, 545; 307/10.1, 9.1, 10.2; 70/237, 262, 271; 318/466–470

(56) References Cited

U.S. PATENT DOCUMENTS

| | | | | | |
|---|---|---|---|---|---|
| 4,427,929 | A | * | 1/1984 | Andrei-Alexandru et al. | 306/10.1 |
| 4,864,153 | A | | 9/1989 | McIntosh, Jr. | 307/10.1 |
| 5,079,538 | A | * | 1/1992 | DeFino et al. | 307/10.2 |
| 5,381,065 | A | * | 1/1995 | Jones | 180/287 |
| 5,698,907 | A | * | 12/1997 | Weber | 307/10.2 |

FOREIGN PATENT DOCUMENTS

| | | |
|---|---|---|
| DE | 3303590 | 8/1984 |
| DE | 0122178 | 12/1990 |
| DE | 20548 A1 | 3/1994 |

* cited by examiner

*Primary Examiner*—Albert W. Paladini
(74) *Attorney, Agent, or Firm*—Christie, Parker & Hale, LLP

(57) ABSTRACT

The invention relates to a device for opening and closing windows (1a, 1b, 1c, 1d) of a motor vehicle having window regulators (4a,4b,4c,4d) which are operated by a secondary force and which can be triggered independently of each other by operating elements (5a,5b,5c,5d) and with an anti-jam protection device (7). According to the invention an additional operating element (8) is provided with which the locking devices (3a, 3b, 3c, 3d) of the vehicle can be triggered, the anti-jam protection device (7) can be deactivated and the window regulators (4a, 4b, 4c, 4d) can be brought jointly into their closing position.

10 Claims, 2 Drawing Sheets

DEVICE FOR SECURING A MOTOR VEHICLE

DESCRIPTION

The invention relates to a device for securing a motor vehicle according to the preamble of claim 1.

Motor vehicles are usually provided with window regulator systems through which several windows of the motor vehicle can be opened and closed by one switch per movable window pane, eg through a service area arranged within reach of the driver.

Particularly in large towns situations can arise where the driver of a vehicle has to protect himself and possible other passengers from attacks from outside by rapidly locking the vehicle. This can be necessary for example with short stops at traffic lights as well as in slow-moving or stationary traffic because such situations can be used to ambush the vehicle and steal valuable items contained therein.

In order to lock the doors in such situations so-called "lock-unlock switches" are known. By operating a switch of this kind set in the vehicle near the driver a central door locking action is triggered in the same way that it is also triggered in known way when leaving and locking up the vehicle.

In order to close open windows which likewise represent a weak spot it is necessary however with the known systems always to operate individually the relevant switch for each opened window. This has the drawback that rapid closing of all the open windows when under threat can only take place with a loss of time wherein additional delays can also occur if the wrong switch is operated by mistake under panic.

Window regulators do as a rule for safety reasons have an anti-jam device which detects when an object is trapped between a window pane and a window frame and reverses the movement of the window pane. An attacker need therefore only place an object or part of the body in the gap of the still open window in order to break the closing process and depending on the type of anti-jam device open the window again fully or in part.

Devices of the type already described were therefore refined so that by continuously operating the relevant switch the relevant window can be closed by by-passing the anti-jam protection device. This does indeed have the advantage that in the event of an attack the window is reliably closed; but the danger of accidental injuries does exist if this function is to be used by mistake in an every day situation. It is not natural for the user of a vehicle that the comfort function "closing a window with anti-jam protection" is triggered by a once-only operation of the corresponding switch whilst the security function "closing of a window without anti-jam protections" is triggered by continuously operating the same switch.

In DE 43 20 548 A1 which describes an opening with a motor-driven vehicle side window and with an anti-jam protection device it is proposed for the purpose of securing the occupant from a third party that the anti-jam device can be switched off by an emergency switch. The emergency switch described, which switches off the anti-jam device for the remaining time of an individual closing process, is to be operated, in addition to a switch which triggers the closing process of an individual pane, before or during the initiated closing process.

This process can only be coordinated in an emergency or panic situation with difficulty since the person under attack has to take care of the decentralized closing of each individual opened window with the relevant switch on the one hand and also switching off the anti-jam device with the additional emergency switch on the other.

Based on this prior art the object of the invention is to provide a device for securing a motor vehicle which allows even under stress and panic situations the immediate and secure locking of all the open windows and doors.

This is achieved according to the invention through the features of claim 1. Preferred and advantageous developments of the invention are provided in the sub-claims.

According to the invention three individual processes can be triggered independently of each other by means of one single additional operating element mounted separately in the inside of the vehicle, namely 1. triggering all the door locking devices of the vehicle so that all the vehicle doors can be locked;
2. closing all the open windows through a common simultaneous release of the relevant window regulator and
3. simultaneous deactivation of the anti-jam protection device.

The solution according to the invention thereby allows even under panic and stress situations a rapid, simple and reliable securing of the vehicle.

The term "deactivation of the anti-jam protection device" thereby embraces all variations for closing the window without the anti-jam function becoming active, thus more particularly both when switching off and by-passing the anti-jam function.

In the solution according to the invention the closing process of the window panes with a simultaneous deactivation of the anti-jam device is indeed only maintained for the duration of the operation of the operating element so that with a break in the operation (eg by letting go the operating element) the closing process of the window panes is accordingly broken off immediately. Despite a deactivated anti-jam protection device a high degree of security is thereby guaranteed against jamming and the accompanying risk of accidental injury to a third party. Opposite this the locking process of the doors already introduced immediately after operating the additional operating element and the subsequent locking of the doors is maintained even when the operation is broken off.

The invention has the advantage that rapid closing of all the open doors and windows is guaranteed without any loss of time. By coupling the locking devices of the doors and windows a simple, rapid and correct handling is guaranteed in emergency cases.

The solution according to the invention also allows a clear separation between the comfort function and the security function. In the comfort function the window panes are in known way opened and closed by means of the associated service elements with an activated anti-jam protection function. In the security function all the window panes are closed simultaneously by means of the additional operating element with a deactivated anti-jam protection device. By clearly separating the two functions, preferably by clearly marking and/or mounting the corresponding structural elements in separate places it is possible to minimize the risk of mistakes during their operation.

In order to increase further the security action it is possible that in addition to the door locking devices the other locking devices of the vehicle, eg boot, sun roof etc are also locked when the operating element is operated.

With an advantageous embodiment of the invention the locking devices of the vehicle (vehicle doors, boot, sunroof etc) are triggered through central locking through the additional operating element.

By combining a device for simultaneously triggering several window regulators with a central door locking system, the circuit for the central door locking can be used simultaneously for the central control of the window regulators, eg the window regulators and locking devices of the vehicle doors can be triggered through common electric leads. An already existing circuit (central door locking) is hereby used for simultaneously closing the windows so that the expense is minimal when providing the central closing device for the windows. Furthermore the latter can be installed afterwards without problem by using the circuitry already contained in the motor vehicle.

The additional operating element is preferably formed as a switch which is in active connection with the drive units of the window regulators through a (preferably electric) circuit assembly. The switch can thereby be formed as a button (eg press button) through which the window regulators are only activated during the time in which the switch is operated by the operator. Closing the windows can be interrupted by letting go the button so that the risk of accidental injury to a third party is substantially eliminated.

The switch can be mounted both in a signal or control circuit and in the supply leads to the relevant window regulators In an advantageous embodiment the additional operating element is designed as a switch with two switching steps wherein the first switching step serves to trigger the locking devices of the vehicle and the second switching step serves to trigger the window regulators and simultaneously deactivate the anti-jam protection device.

Preferably when operating the additional operating element only the window regulators of those windows which are open are triggered. This can be achieved with the known systems which detect through sensors the end positions of the window panes to be moved and where applicable carry out an end switch-off. Energy is thereby saved and the motors of the window regulators conserved because only the relevant motors required need run up to the end of the entire closing process which is to be carried out in an emergency situation.

In an advantageous embodiment only one additional operating element is provided which is mounted within reach of the driver and/or a front passenger.

However there are also variations where several additional operating elements are provided which are preferably each fitted on the doors and which each trigger by themselves the same processes in the event of and during their activation.

In order to meet the strict safety requirements which are to prevent injuries as a result of the deactivation of the anti-jam protection device the window regulators can preferably only be triggered by the additional operating element when a) the vehicle door with which the relevant window regulator is associated, is closed and/or b) the vehicle key is fitted in the ignition lock and/ c) the vehicle engine is running.

With a further embodiment of the invention the additional operating element also activates a signal device. The signals emitted can be for example acoustic and/or optical and can be produced both by means of devices belonging to the vehicle (eg horn or head lights) and by means of separate devices.

The solution according to the invention can also be produced by providing in each of the doors having the window regulators a control device which is in active connection with the additional operating element on one side and with the window regulator belonging to the relevant door on the other. In this case each control device contains an anti-jam protection device which is associated with each window regulator. Furthermore a service area is preferably associated with each control device by means of which the comfort function "opening and closing the window regulator with activation of the anti-jam protection" can be triggered.

The additional operating element is thereby preferably mounted within the reach of the vehicle driver and his front passenger respectively, thus more particularly on the inside of the passenger/driver door or in the area of the vehicle dashboard, so that children seated in the back seats do not have access to the additional operating element.

The control devices can obviously also serve to control the locking devices of the vehicle doors.

Further advantages of the invention will now be explained with reference to the embodiments described and illustrated in the drawings in which:

FIG. 1 shows diagrammatically a preferred embodiment of the invention.

Figure 1:
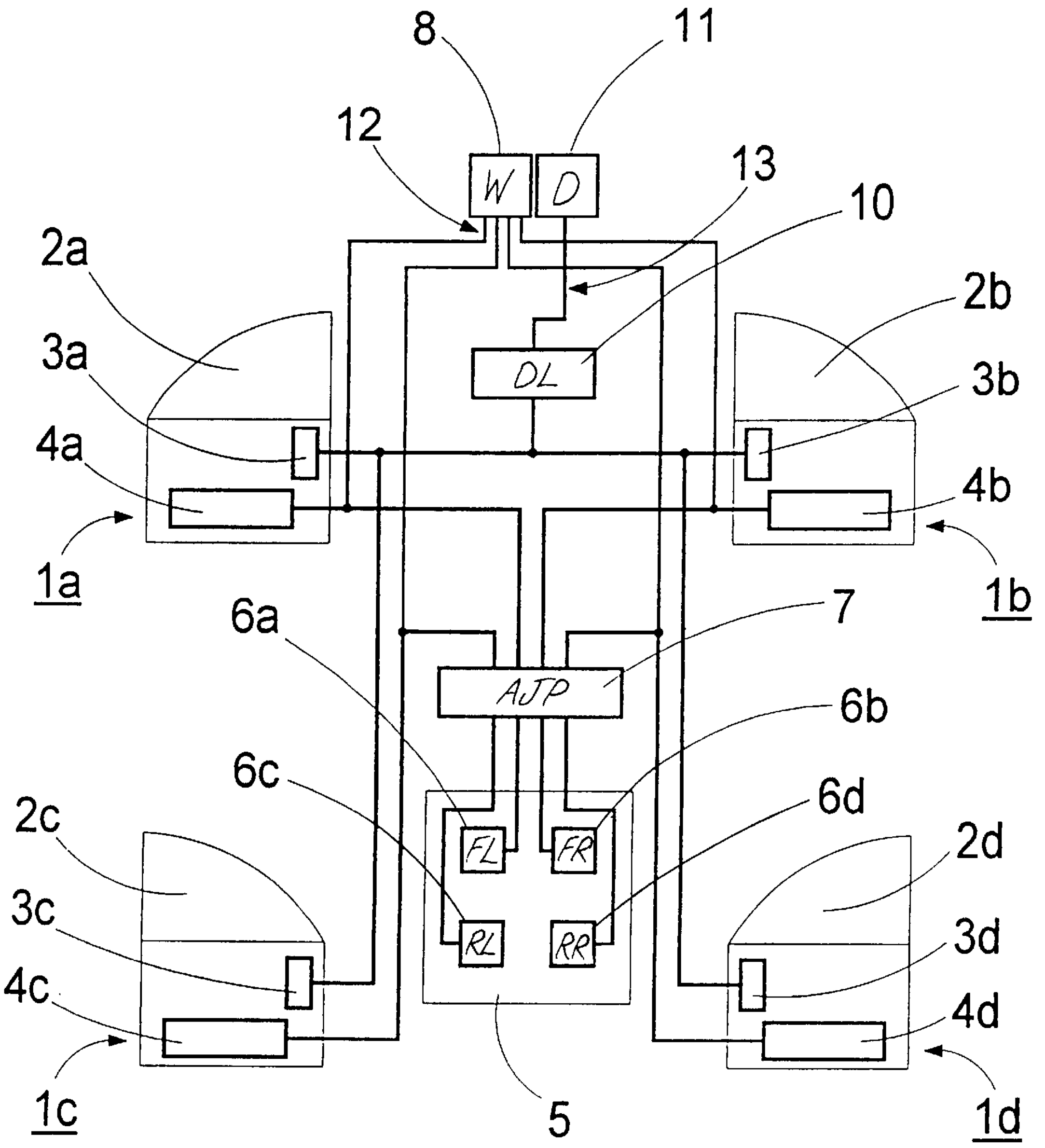
FIG. 1 is a diagrammatic view of a device for simultaneously closing several windows of a motor vehicle.

The drawing shows four vehicle doors 1_a_–1_d_ with windows 2_a_–2_d_. Each door 1_a_–1_d_ has a locking device 3_a_–3_d_ (door lock) and an electric window regulator (4_a_–4_d_) for raising and lowering the relevant window pane.

A service area 5 mounted within the reach of the driver has four switches 6_a_–6_d_ which are in active connection through an anti-jam protection device 7 with the relevant window regulators 4_a_–4_d_ of the front left door 1_a_, front right door 1_b_, rear left door 1_c_ and rear right door 1_d_. Obviously instead of one central anti-jam protection device 7 several decentralized anti-jam protection devices can also be provided associated with the individual windows 2_a_–2_d_. Furthermore additional service areas can also be provided by means of which other passengers in addition to the driver can open and close the windows 2_a_–2_d_.

In addition a switch 8 mounted within the reach of the driver is in active connection with the drive units of the window regulators 4_a_–4_d_ through an electric circuit 12. When the switch 8 is operated all the window regulators 4_a_–4_d_ which are not in their closed position can be brought together into their closed position by by-passing or switching off the anti-jam protection device 7. A further switch 11 is mounted next to this switch 8 and is connected through central door locking 10 in a circuit arrangement 13 in known way with the locking devices 3_a_–3_d_ of the vehicle doors 1_a_–1_d_.

The connecting leads of the circuits 12,13 in the present case concern signal leads which allow the window regulators 4_a_–4_d_ and locking devices 3_a_–3_d_ to be controlled through the switches 8,11. The invention also includes however variations where the switch 8 engages on the relevant supply leads of the window regulators 4_a_–4_d_.

In everyday use the user opens and closes the windows 2_a_–2_d_ by means of the switches 6_a_–6_d_ which are associated with the individual windows and which trigger the relevant window regulators 4_a_–4_d_. The closing process is monitored during operation of the switches 6_a_–6_d_ by the anti-jam protection device 7 which triggers a stop and reverse movement of the corresponding window pane when an object or part of the body is trapped between the top edge of the window pane and the window frame.

By operating the additional switch 8 it is furthermore possible to control all the window regulators 4a–4d simultaneously and with deactivation of the anti-jam protection device 7 when a threat from outside the vehicle makes this necessary.

In emergency situations a rapid, simultaneous closing of all open windows 2a–2d is thus guaranteed by by-passing the anti-jam protection device 7. Different markings and spatial separation of the additional switch 8 from the service area 5 of the remaining switches 6a–6d makes it possible to clearly separate the comfort function from the security function so that accidental triggering of the additional switch 8 is avoided.

Through the switch 11 mounted next to the additional switch 8 central door locking 10 is controlled which allows simultaneous closing of all the doors 1a–1d by means of the corresponding locking devices 3a–3d.

By linking the switches 8,11 structurally close together, closing the windows 2a–2d and locking the doors 1a–1d can be carried out with one hand movement which allows a rapid panic-initiated emergency locking of the windows and doors.

In a preferred variation it is proposed that by means of only one switch 8 both the windows 2a–2d are closed and the anti-jam protection device 7 deactivated and also the doors 1a–1d are locked, the functions of the switch 11 thus being integrated in the switch 8.

The switch 8 can thereby be formed with two switching steps wherein the first switching step serves to trigger the locking devices of the vehicle and the second switching step additionally triggers the window regulators.

Figure 2:
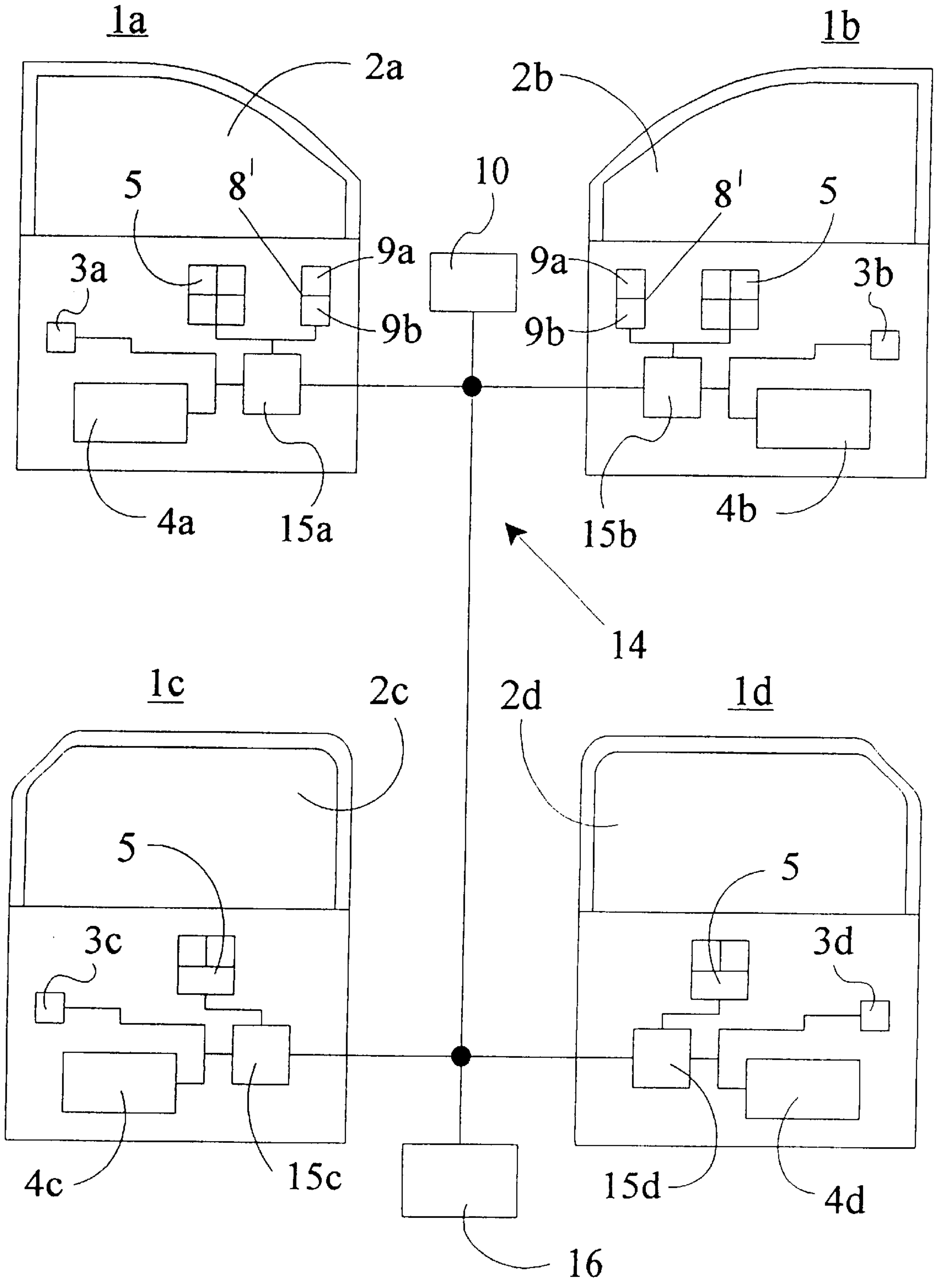
FIG. 2 shows a modification of the embodiment of FIG. 1.

According to the modification shown in FIG. 2 of the previous embodiment a control device 15a–15d (door control device) is provided in each vehicle door 1a–1d and serves both to control the relevant door locking device 3a–3d and also the relevant window regulator 4a–4d. Each control device 15a, 15b, 15c and 15d contains an anti-jam protection device which is each allocated directly with one window regulator 4a, 4b, 4c and 4d (decentralized anti-jam protection).

Each control device 15a–15d is furthermore allocated its own service area with which the comfort function "opening or closing the windows 2a–2d with activation of the anti-jam protection" can be triggered. It can thereby be proposed for example that the driver can open and close all the windows 4a–4d whilst the remaining passengers can however each only adjust one of the windows.

The door locking deices 3a–3d as well as where applicable the other locking devices for the boot, sunroof etc are triggered by a central locking 10 whose signals are processed in the control devices 15a–15d and are then directed to the door locking devices 3a–3d.

An additional switch 8 is mounted on each of the two front doors 1a,1 b and has two switching steps 9a,9b. If one of the switches 8 is moved through corresponding activation into the first switching step 9a then the leads of the electrical circuit 14 transfer an impulse to the central locking 10 so that this is triggered and locks the door locking devices 3a–3d, boot etc. The drive units of the window regulators 4a–4d do not however react to this impulse.

If the switch 8 is moved beyond the first switching step 9a into the second switching step 9b then through the control devices 15a–15d the window regulators 4a–4d are additionally triggered and all the open windows 2a–2d are locked with deactivation of the associated anti-jam protection devices. Closing of the windows and deactivation of the anti-jam protection devices thereby take place only for the time during which the switch 8 is operated. Simultaneous closing of the windows 2a–2d is thereby possible since all the control devices 15a–15d in the electric circuit 14 are in active connection with each other,.

As an alternative it is proposed to dispense with the two switching steps 9a,9b and that when the switch 9 is operated automatically both locking of all the doors and closing of all the windows are carried out with deactivation of the anti-jam protection.

Since no additional switches for simultaneously closing the windows 2a–2d with deactivation of the anti-jam protection are provided on the rear doors 1c,1d, it is not possible for children seated in the back to trigger the window regulators 4a–4d with deactivation of the anti-jam protection which could endanger third parties.

In order to draw the attention of a third party to an attack on the vehicle an alarm system 16 is also activated when operating the additional switch 8.

What is claimed is:

1. A device for securing a motor vehicle having a plurality of doors and windows, comprising:

a plurality of operating elements;

a plurality of window regulators which can be triggered to move the windows independently of each other by the operating elements;

at least one anti-jam protection device for the window regulators which can be deactivated when necessary;

a plurality of locking devices, each associated with one of the plurality of vehicle doors; and at least one additional separate operating element mounted inside the vehicle and operatively connected to each of the plurality of window regulators, the at least one anti-jam protection device, and the plurality of locking devices, wherein a) when operated, the at least one additional separate operating element triggers the locking devices to lock the associated vehicle door, and b) for all of the time the at least one additional separate operating element is operated said element triggers the window regulators to operate in a closing direction of the windows and deactivates the at least one anti-jam protection device.

2. The device according to claim 1, comprising a plurality of drive units for the window regulators for providing the secondary force, and wherein the additional operating element is a switch in active connection with the drive units through an electric circuit assembly.

3. The device according to claim 1, wherein the additional operating element is a switch with first and second switching steps, and wherein the first switching step so triggers the locking devices and the second switching step so triggers the window regulators and simultaneously deactivates the anti-jam protection device.

4. The device according to claim 1, wherein said at least one additional operating element mounted within the reach of at least one of a vehicle driver and a front passenger.

5. The device according to claim 1, wherein said at least one additional operating element comprises only one additional operating element each attached to a different one of such plurality of vehicle doors and each such additionally operating elements performs the same processes in the event of and during their operation.

6. The device according to claim 1, wherein such vehicle has an ignition lock and wherein the window regulators can only be triggered by means of the at least one additional operating element when such vehicle key is in such ignition lock of such motor vehicle.

7. The device according to claim 1, wherein a signal system is additionally activated by means of the additional operating element.

8. The device according to claim 1, wherein the vehicle doors, each having a window regulator, are each associated with a control device which is in active connection with both the additional operating element and the window regulator associated with the relevant door.

9. The device according to claim 8, wherein the locking devices of the vehicle doors can also be controlled with the control devices.

10. A motor vehicle comprising a plurality of vehicle doors, each said door having associate therewith a movable window pane, a window regulator operatively connected to and adapted to drive the window pane in one of a closing and an opening direction, a lock, a locking device operatively connected to and adapted to engage the lock when operated, and at least one anti-jam protection device operatively connected to at least one of the window regulators, a device for securing the motor vehicle comprising:

at least one additional separate element mounted inside the motor vehicle and operatively connected to each of the window regulators, the locking devices, and the at least one anti-jam protection device, operation of the separate operating element operating each of the locking devices to engage each of the locks and operating each of the window regulators to drive each of the window panes in a closing direction in such vehicle and de-activating the anti-jam protection device while the at least one additional separate element is being operated.

* * * * *